United States Patent
Behruzi et al.

(10) Patent No.: US 8,381,938 B2
(45) Date of Patent: Feb. 26, 2013

(54) PROPELLANT TANK FOR CRYOGENIC LIQUIDS

(75) Inventors: Kei Philipp Behruzi, Bremen (DE); Mark Michaelis, Bremen (DE); Gaston Netter, Vollersode (DE); Andreas Rittweger, Achim (DE)

(73) Assignee: Astrium GmbH, Taufkirchen (DE)

( * ) Notice: Subject to any disclaimer, the term of this patent is extended or adjusted under 35 U.S.C. 154(b) by 968 days.

(21) Appl. No.: 11/922,810

(22) PCT Filed: Sep. 13, 2006

(86) PCT No.: PCT/DE2006/001605
§ 371 (c)(1), (2), (4) Date: Dec. 21, 2007

(87) PCT Pub. No.: WO2007/031064
PCT Pub. Date: Mar. 22, 2007

(65) Prior Publication Data
US 2009/0134170 A1 May 28, 2009

(30) Foreign Application Priority Data
Sep. 17, 2005 (DE) .......................... 10 2005 044 534

(51) Int. Cl.
*F17C 13/00* (2006.01)
(52) U.S. Cl. .............................. 220/560.11; 220/560.04
(58) Field of Classification Search ............... 220/560.1, 220/564, 560.12, 560.13, 560.04, 560.07, 220/560.11, 560.15, 566; 62/50.1, 45.1; 137/574, 590, 208, 206, 154; 96/183; 244/172.3
See application file for complete search history.

(56) References Cited

U.S. PATENT DOCUMENTS

| | | | |
|---|---|---|---|
| 2,107,390 A | 2/1938 | Rosmait | |
| 2,163,988 A | 6/1939 | Stacey | |
| 2,519,393 A | 8/1950 | Noyes | |
| 2,643,022 A * | 6/1953 | Cornell | 220/560.1 |
| 2,711,756 A | 6/1955 | Peck et al. | |
| 2,732,071 A | 1/1956 | Crow | |

(Continued)

FOREIGN PATENT DOCUMENTS

| | | |
|---|---|---|
| CA | 683 854 | 4/1964 |
| DE | 100 40 755 | 3/2002 |

(Continued)

OTHER PUBLICATIONS

DE10117557 Translation.*

(Continued)

*Primary Examiner* — Anthony Stashick
*Assistant Examiner* — Jeffrey Allen
(74) *Attorney, Agent, or Firm* — Walter F. Fasse

(57) ABSTRACT

In a propellant tank, which especially stores cryogenic propellants, for example a fuel or an oxidizer for a spacecraft, and which operates with a driving gas to drive or convey the propellant, the propellant is separated from the driving gas in a propellant extraction apparatus using sieves with hydrostatic forces and capillary forces. The extraction apparatus includes a refillable reservoir, which is mounted near the tank floor outside of the tank shell, and which is connected via plural holes with the interior of the propellant tank. The extraction apparatus includes a double-walled housing that is thermally insulated. Capillary plates and struts are inserted in an L-shape into the reservoir. To substantially prevent the penetration of gas out of the propellant line, a cylinder-shaped pleated sieve is mounted at the end of the propellant line.

20 Claims, 4 Drawing Sheets

U.S. PATENT DOCUMENTS

| | | | |
|---|---|---|---|
| 2,884,937 A | 5/1959 | Myers, Jr. | |
| 2,943,815 A | 7/1960 | Besson | |
| 3,020,950 A | 2/1962 | Schraivogel | |
| 3,084,472 A | 4/1963 | Feik | |
| 3,180,084 A | 4/1965 | Meeks | |
| 3,202,160 A | 8/1965 | Barger | |
| 3,232,560 A | 2/1966 | Moise et al. | |
| 3,234,728 A | 2/1966 | Christian et al. | |
| 3,234,853 A | 2/1966 | Aber | |
| 3,296,809 A | 1/1967 | Feuerstein | |
| 3,315,845 A | 4/1967 | Vaiden | |
| 3,457,864 A | 7/1969 | Price | |
| 3,744,738 A | 7/1973 | Howard | |
| 3,782,416 A | 1/1974 | Levin | |
| 3,854,905 A | 12/1974 | Balzer et al. | |
| 3,933,448 A | 1/1976 | Di Peri | |
| 4,027,494 A | 6/1977 | Fletcher et al. | |
| 4,101,045 A * | 7/1978 | Roberts et al. | 220/560.12 |
| 4,148,196 A * | 4/1979 | French et al. | 62/55.5 |
| 4,168,718 A | 9/1979 | Hess et al. | |
| 4,253,490 A | 3/1981 | Hansel | |
| 4,272,257 A | 6/1981 | Ellion et al. | |
| 4,394,966 A | 7/1983 | Snyder et al. | |
| 4,399,831 A | 8/1983 | Robert | |
| 4,435,196 A | 3/1984 | Pielkenrood | |
| 4,442,008 A * | 4/1984 | Seurin | 210/683 |
| 4,489,745 A | 12/1984 | Netter et al. | |
| 4,586,343 A | 5/1986 | Buschkens et al. | |
| 4,617,031 A | 10/1986 | Suh et al. | |
| 4,709,723 A | 12/1987 | Sidaway et al. | |
| 4,715,399 A * | 12/1987 | Jaekle et al. | 137/209 |
| 4,733,531 A | 3/1988 | Grove | |
| 4,743,278 A | 5/1988 | Yeh | |
| 4,768,541 A | 9/1988 | Uney et al. | |
| 4,790,350 A | 12/1988 | Arnold | |
| 4,790,472 A * | 12/1988 | Bunkoczy | 228/171 |
| 4,844,276 A | 7/1989 | Kunze et al. | |
| 4,848,987 A | 7/1989 | Howard et al. | |
| 4,898,030 A | 2/1990 | Yeh | |
| 4,901,762 A | 2/1990 | Miller, Jr. et al. | |
| 4,976,398 A | 12/1990 | Bruhn | |
| 5,071,093 A | 12/1991 | Perdu | |
| 5,209,115 A | 5/1993 | Bond | |
| 5,240,038 A | 8/1993 | Canedi | |
| 5,263,329 A | 11/1993 | Grove et al. | |
| 5,279,323 A | 1/1994 | Grove et al. | |
| 5,293,895 A | 3/1994 | Grove et al. | |
| 5,441,219 A | 8/1995 | Rauscher, Jr. | |
| 5,632,151 A * | 5/1997 | Baker et al. | 62/64 |
| 5,743,096 A * | 4/1998 | Blanton et al. | 62/50.1 |
| 5,901,557 A | 5/1999 | Grayson | |
| 6,003,534 A | 12/1999 | Gould et al. | |
| 6,014,987 A | 1/2000 | List et al. | |
| 6,298,868 B1 | 10/2001 | Dean et al. | |
| 6,536,468 B1 | 3/2003 | Wilmer et al. | |
| 6,634,519 B2 * | 10/2003 | Pelloux-Gervais et al. | 220/560.1 |
| 6,708,502 B1 * | 3/2004 | Aceves et al. | 62/45.1 |
| 6,745,983 B2 | 6/2004 | Taylor | |
| 6,751,945 B1 | 6/2004 | Knight | |
| 6,840,275 B2 * | 1/2005 | Grayson | 137/590 |
| 7,077,885 B2 | 7/2006 | Charlat | |
| 7,395,832 B2 | 7/2008 | Behruzi et al. | |
| 2007/0084509 A1 | 4/2007 | Behruzi et al. | |
| 2007/0145194 A1 | 6/2007 | Behruzi et al. | |
| 2008/0237099 A1 | 10/2008 | Behruzi et al. | |

FOREIGN PATENT DOCUMENTS

| | | |
|---|---|---|
| DE | 101 17 557 | 10/2002 |
| EP | 0 042 784 | 12/1981 |
| EP | 0 476 720 | 3/1992 |
| FR | 2 182 503 | 12/1973 |
| GB | 2 109 760 | 6/1983 |

OTHER PUBLICATIONS

DE 10117557 Translation, Aug. 26, 2010.*

* cited by examiner

PROPELLANT TANK FOR CRYOGENIC LIQUIDS

FIELD OF THE INVENTION

The invention relates to a propellant tank, especially a tank for storing cryogenic liquids such as propellants or fuels as well as oxidizers for the operation of spacecraft, with a driving gas serving as a conveying medium as well as with at least one extraction apparatus in the form of a refillable reservoir, in which a separation of the propellant from the driving gas is brought about with use of the surface tension.

BACKGROUND INFORMATION

In spacecraft, driving gases often serve for conveying the propellant out of the propellant tanks into the combustion or reaction chamber. For cryogenic liquids, helium (He) is typically used as the driving gas, which impinges or acts on the propellant container and which thereby presses the propellant into the pipeline system leading to the respective engine. In that regard, a complete and sure separation between the driving gas serving as the conveying medium and the propellant coming into the engine is important in such a tank, as it is known from the DE 101 17 557 A1 for example, because the propellant coming into the engine, upon its ignition, must necessarily be free of foreign gas inclusions.

Due to their higher effectiveness with simultaneous lower weight, cryogenic propellants are preferred if possible to the conventional liquid propellants, such as MMH for example.

However, with cryogenic propellants it becomes disadvantageous that they are not storable at room temperatures, in contrast to conventional propellants. For example, liquid hydrogen, also designated as LH2, transitions into the gaseous state at a temperature of approximately 30 K., so that a sufficient insulation of the propellant tank is indispensable, in order to ensure the storability over a sufficient time span. A similar aspect applies for liquid oxygen (LOX), which is used together with the LH2 and stored in separate tanks. For longer storage, an insulation of the propellant tanks becomes necessary, due to the heat inputs from solar insolation and hot components such as engines among other things.

In contrast to a use of non-cryogenic storable propellants, with cryogenic propellants the generally warmer tank wall can lead to simmering or boiling initiation of the liquid in the proximity of the tank wall, by which a bubble-free propellant transport or conveyance is made more difficult. Therefore, special requirements of such a tank are presented especially by the thermal insulation of the reservoir forming the extraction apparatus for avoiding gas formation within the reservoir and the form or configuration of guide plates arranged in the reservoir. In that regard, these guide plates are arranged within the reservoir so that the liquid is positioned in a stable manner in the reservoir and that gas bubbles are driven out of the reservoir back into the tank. This holding effect is supported or assisted by the local change of the capillary pressure.

An additional problem is represented by the bubble-free propellant transport or conveyance under the condition of weightlessness. A bubble-free propellant conveyance can be achieved, for example, through a pre-acceleration by means of auxiliary rockets that are carried along. This pre-acceleration then leads to a reorienting and positioning of the liquid in the vicinity of the outlet pipe. In this regard, the process of the ignition comprises or includes, first, that a cool-down phase of the line or conduit system to the operating temperature, followed by the actual ignition phase of the engines, occur. In the cool-down phase, largely or predominantly cold, liquid propellant is conveyed out of the propellant tank into the conduit system. Also for this cool-down phase, the invention can unlimitedly supply propellant. An ignition of the engine first occurs when the entire system is bubble-free after the cool-down to the operating temperature.

SUMMARY OF THE INVENTION

It is the object of the invention to embody a propellant tank of the initially mentioned type so that in connection with the use of cryogenic propellants it ensures a bubble-free propellant conveyance through the use of hydrostatic forces as well as capillary forces as an alternative to a pre-acceleration.

The invention achieves this object through a propellant tank in which the extraction apparatus is arranged in the lower area on the outside of the tank wall. This reservoir is connected with the interior of the propellant tank through preferably circular openings in the tank wall, so that liquid can flow into the reservoir.

In the preferred embodiment of the invention, the reservoir is provided with an insulation as well as a heat trap, and therefore is especially suited for toroid-shaped tanks as well as tanks with an intermediate floor, as they are utilized or will be utilized in the future in similar form, for example as LH2 tanks in the cryogenic upper stage ESC-A or the planned ESC-B of the Ariane 5.

The embodiment of the extraction apparatus provided for the propellant tank according to the invention thereby has the advantage that it is also capable of conveying propellant even with very high rotation rates about the tank longitudinal axis of the rocket stage equipped with such a tank. Thus, a sure or reliable propellant conveyance is ensured even for non-nominal behaviors of the stage. The inventive extraction apparatus can, already completely assembled, be tested in a separate test stand. Moreover, no further components are needed within the propellant tank, but rather the extraction apparatus is applied or installed as a separate component externally on the tank wall. The tank shells for large tanks, such as the ESC-A LH2 tank of the Ariane 5, typically consist of individual segments, so that the reservoir can be fitted into one of the segments before the tank shells are assembled together.

The omission or avoidance of a pre-acceleration and therewith of the carrying along of separate auxiliary rockets enables an additional weight savings and consequently a higher useful payload in connection with multiple re-ignition. The reservoir ensures a stable positioning of the propellant at the outlet and does not limit the number of the re-ignitions, even not for very small residual or remaining fill levels in the tank. Thus, the number of possible re-ignitions is merely dependent on the respective required propellant quantity. In that regard, the tank according to the invention is suitable in similar manner both for the storing of cryogenic propellants, such as LH2, as well as for the storing of liquid oxygen in the form of LOX.

BRIEF DESCRIPTION OF THE DRAWINGS

In the following, the inventive propellant tank will be explained in more detail in connection with an example embodiment illustrated in the drawing. It is shown by.

DETAILED DESCRIPTION OF AN EXAMPLE EMBODIMENT OF THE INVENTION

Figure 1:
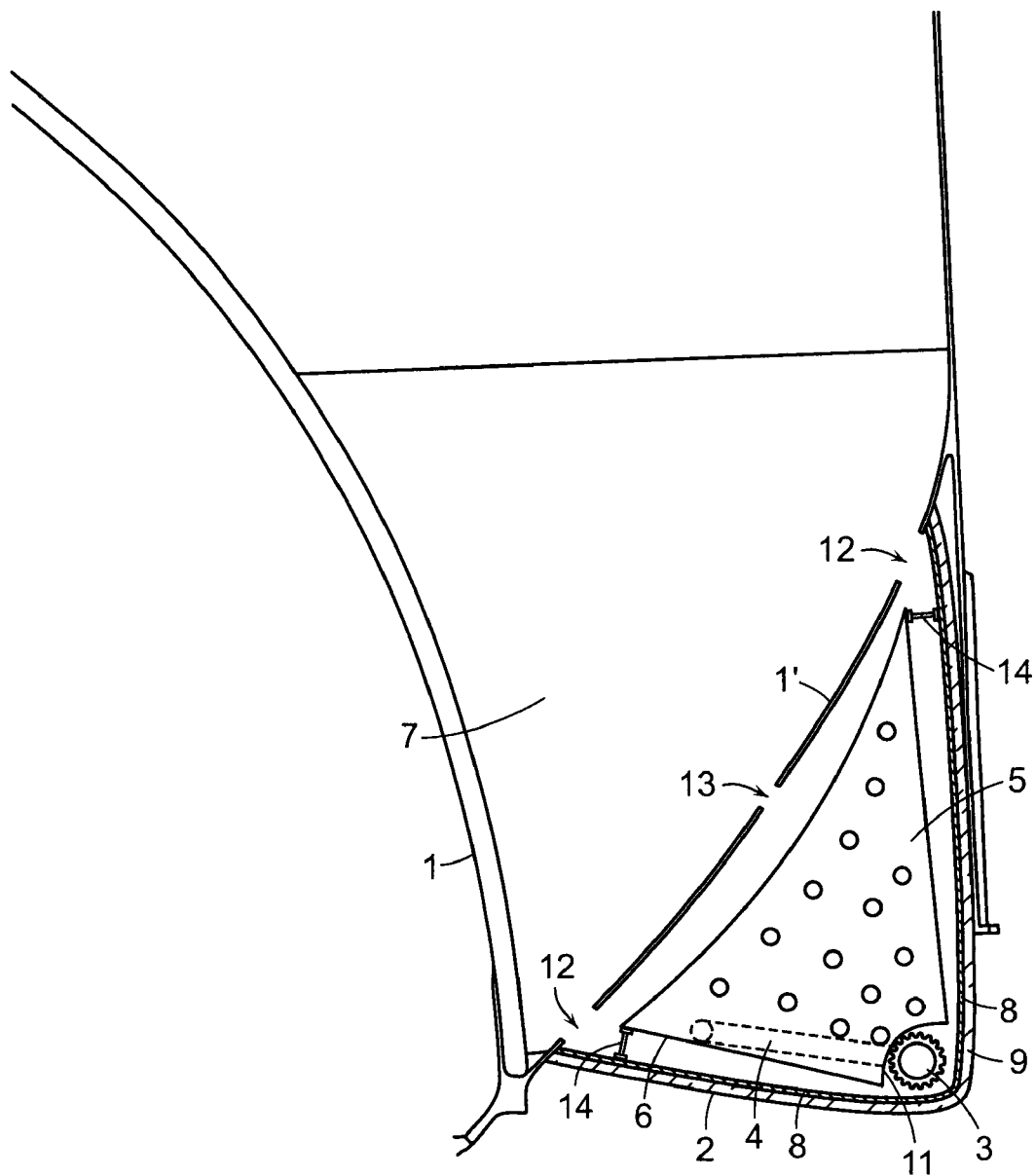
FIG. 1 a cut-out portion out of an LH2 propellant tank with an extraction apparatus, FIG. 2 an extraction apparatus according to FIG. 1, seen from above and sectioned in the area of the sieve adapter, FIG. 3 a cut-out portion out of an extraction apparatus according to the FIGS. 1 and 2 in a three-dimensional illustration, and FIG. 4 a cut-out portion of the outlet pipe within the extraction apparatus according to the FIGS. 1 to 3, which is embodied as a so-called heat pipe.

The propellant tank shown in a partial section in FIG. 1 is a tank for receiving and storing cryogenic propellant as a partial element of a toroidal tank, as it forms in a similar configuration, for example, the lower part of the LH2 tank in the present-day upper stage ESC-A of the Ariane 5 rocket. Generally, toroidal tanks are characterized in that four propellant tanks, respectively two for LH2 and two for LOX, together form the shape of a toroid. In such a tank embodiment, the example embodiment illustrated here would be used for each propellant tank respectively a separate outlet.

The propellant tank illustrated in FIG. 1 consists of two half shells 1 and 1', that are connected with one another and that form a toroid-shaped receiving container 7. As can be seen in the axial section view of FIG. 1, the shell or tank wall portion 1 has a concave curvature and the shell or tank wall portion 1' has a convex curvature and is arranged radially outwardly around the concave tank wall portion 1. The two shells or wall portions 1 and 1' converge toward one another at an acute angle and are joined together at a bottom vertex. At this bottom vertex or connection area of the two half shells 1 and 1', the tank wall thereby embodies a very strong curvature, so that liquids preferentially collect or accumulate in this area in the weightless condition. Moreover, the capillary pressure difference is especially high in this area, so that a pumping effect in a direction of this corner arises. Therefore, this area of the propellant tank is especially well suited to arrange here an extraction apparatus in the form of a refillable reservoir 2, as shown in FIG. 1 so that the bottom of the reservoir space in the reservoir can extend below the bottom of the tank interior space in the tank.

Figure 2:
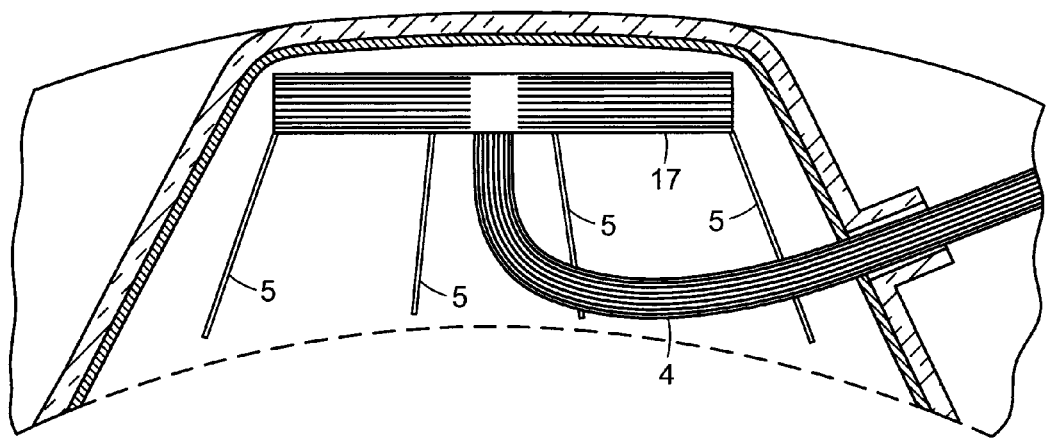

In order to ensure a trouble-free conveyance also during flight phases with high rotation rates, the reservoir 2 is mounted or installed from the outside on the tank wall 1' in such a manner so that the liquid preferentially collects or accumulates in this reservoir 2 even with a pure spin loading. The reservoir 2 is embodied double-walled in order to minimize the heat input into this reservoir 2 as will be explained in more detail in the following. As can be seen from FIGS. 1 and 2 and the description herein, the tank interior space is bounded annularly between the tank wall portions 1 and 1', while the reservoir space bounded within the reservoir 2 is limited to a limited circumferential portion of a periphery of the tank.

The propellant is sucked out of the reservoir 2 through a sieve 3 that is provided with folds, that is to say a "pleated" sieve 3. The sieve has both the function of a contaminant sieve as well as that of a bubble trap, which substantially or predominantly prevents the penetration of gas into the reservoir 2 from a propellant line 4 that is filled with steam or vapor during long ballistic phases. The propellant line 4, also designated as an outlet pipe, which is located outside of the reservoir 2 according to FIG. 3, joins or opens into the reservoir and ends on the sieve adapter 3. From the propellant line 4 into the reservoir 2, in-flowing or penetrating gas is lead away into the receiving container 7 of the propellant tank via the metal plates 5 and 6 provided in the reservoir 2. Thereby, a wetting of the sieve 3 during ballistic phases is ensured. In order to ensure a sufficiently high throughflow rate through the sieve 3, the sieve area must be as large as possible. For this reason, as recognizable in FIG. 2, two cylinder-shaped sieve elements 17 with star-shaped cross-section, also designated as pleated, are installed to the right and the left of the outlet pipe 4 within the reservoir 2. In its partial region extending within the reservoir 2, the outlet pipe 4 is embodied as a so-called heat pipe and has an outer surface that is provided with longitudinal grooves. Thereby, inward penetrating heat is better given off out of the pipe 4 to the liquid. The liquid, referenced with the reference character 15 in FIG. 4, evaporating on the pipe wall is replaced by liquid that flows in due to the effective capillary forces, so that the surface in this region is again wetted and a drying of the pipe surface is avoided; simultaneously by this process the heat is carried away out of the pipe 4. The heat input or introduction along the pipe 4 in the direction of the sieve adapter 3 is thereby reduced. Moreover, in the cool-down phase carried out before the actual re-ignition, the pipe needs to be cooled-down less strongly.

For minimizing the in-flowing or penetrating residual heat, the reservoir 2 is embodied double-walled and vacuum-insulated, as is recognizable in FIG. 1. Due to the higher tank interior pressure of approximately 3 bar, for structural reasons the reservoir 2 is embodied as a shell element. Before the lift-off, for the purpose of a better thermal insulation on the ground, a vacuum pump can be connected, which is operated during this phase on the ground and can be capped or cut-off shortly before the lift-off. Moreover, an additional multi-layered insulation in the form of a so-called Multi-Layer-Insulation (MLI) is provided within the double-walled embodied wall 8 of the reservoir 2, whereby this Multi-Layer-Insulation insulates against radiation heat. Furthermore, the reservoir 2 is thermally insulated from the outside additionally by insulating foam 9.

Figure 3:
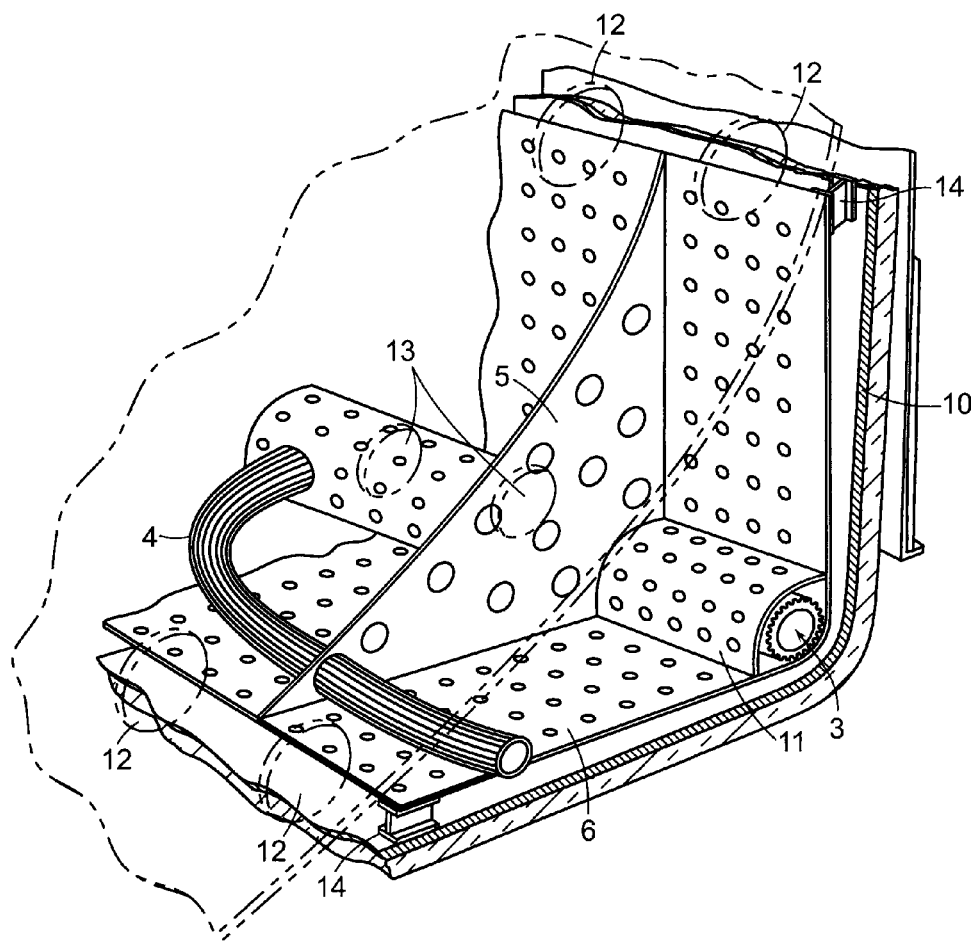
Figure 4:
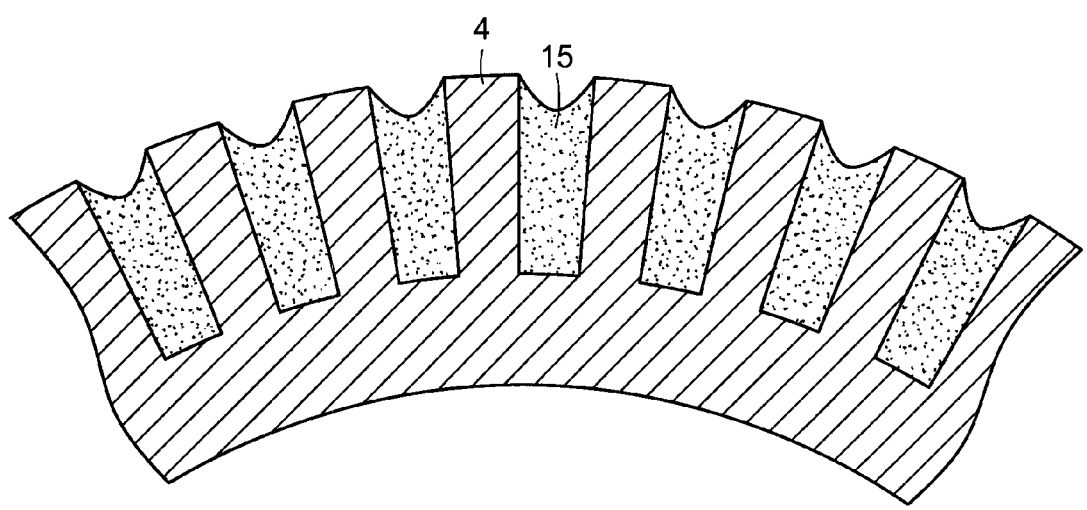

As recognizable in FIG. 3, an L-shaped metal plate 6 is installed within the reservoir 2 at a spacing distance of approximately 6 to 8 mm from the reservoir wall. Bored holes in this metal plate 6 thereby enable a throughflow through the metal plate. Vertical transverse ribs 5 stiffen the L-shaped metal plate 6 and additionally promote the driving-out of gas out of the reservoir 2. According to FIG. 2, the transverse ribs 5 are installed slightly conically relative to one another toward the tank. The capillary effect achieved thereby additionally supports or assists the driving-out of gas or steam or vapor out of the reservoir 2. The pleated sieve 3 is located in the angle of the L-shaped metal plate 6, and is connected with the L-shaped metal plate 6 by two vertical or perpendicular end plates and by the outlet pipe 4.

The metal plate 6 is connected via spacers 14 with the inner reservoir wall 10. These spacers 14 are located at the maximum possible distance away from the pleated sieve 3, so as to thereby better thermally decouple the sieve 3 from the warm tank wall 1, 1'. Furthermore the spacers 14 are fabricated in such a manner so that they ensure an optimal insulation between the reservoir wall 8 and the L-shaped metal plate 6.

The sieve 3 is bounded on the one hand by the reservoir wall 8 and on the other hand by a perforated metal plate 11 in a form or shape similar to a cylinder cutaway portion. Due to its capillary effect, this promotes the re-wetting of the sieve 3. Arising gas bubbles are driven through the gap between the inner reservoir wall 10 and the L-shaped metal plate 6 out of the reservoir 2 back into the receiving container 7 of the propellant tank.

Preferably circular or oval openings 12, 13 in the tank wall 1' to the reservoir 2 permit an exchange both of liquid as well as of gas between these two regions. The gas or the vapor can return through these openings back into the receiving container 7 of the propellant tank, and liquid out of the receiving container 7 of the propellant tank can supplement or complement the gas volume. In that regard, several larger openings 12, as they correspond with respect to the diameter approximately to the diameter of the outlet pipe 4, are provided in the lower and upper region of the reservoir 2, and several smaller openings 13 are provided in the middle part of the reservoir 2.

The invention claimed is:

1. A liquid storage tank arrangement for a spacecraft, adapted to store a liquid for operation of the spacecraft and a pressurized driving gas for driving the liquid out of said liquid storage tank arrangement, said liquid storage tank arrangement comprising:
 a liquid storage tank enclosing a tank interior space adapted to store the liquid and the driving gas therein, wherein said tank includes a concave tank wall that is concavely curved on a section plane and a convex tank wall that is convexly curved on said section plane, said convex tank wall is arranged radially outwardly around said concave tank wall, said convex tank wall and said concave tank wall converge toward one another and are joined together at a bottom vertex on said section plane, said tank interior space is bounded annularly between said convex tank wall and said concave tank wall and tapers toward a tank interior space bottom formed at said bottom vertex, and a selected area of said convex tank wall has plural throughholes penetrating therethrough; and
 a liquid extraction arrangement comprising features adapted to separate the liquid from the driving gas, a liquid reservoir that comprises a reservoir wall arranged radially outwardly on and protruding radially outwardly from said selected area of said convex tank wall such that a reservoir space is bounded between said reservoir wall and said selected area of said convex tank wall, and a liquid outlet pipe that communicates from said reservoir space out of said liquid reservoir, wherein said reservoir space communicates with said tank interior space through said throughholes in said selected area of said convex tank wall;
 wherein said selected area of said convex tank wall having said throuqhholes is limited to a limited circumferential portion of a periphery of said convex tank wall, and said reservoir wall extends partially circumferentially on only said limited circumferential portion of said periphery.

2. The liquid storage tank arrangement according to claim 1, wherein said section plane is an axial plane extending along a longitudinal axis of said tank about which said tank interior space extends annularly between said convex tank wall and said concave tank wall.

3. The liquid storage tank arrangement according to claim 1, wherein said convex tank wall and said concave tank wall converge to said bottom vertex at an acute angle relative to one another on said section plane.

4. The liquid storage tank arrangement according to claim 1, wherein said reservoir wall joins onto said convex tank wall adjacent to said bottom vertex.

5. The liquid storage tank arrangement according to claim 1, wherein said section plane extends along an axis about which said convex tank wall and said concave tank wall extend circumferentially, and wherein a radial plane that extends normal to said axis and passes through said bottom vertex also passes through a bottom portion of said reservoir space bounded within said reservoir wall.

6. The liquid storage tank arrangement according to claim 1, wherein said section plane extends along an axis about which said convex tank wall and said concave tank wall extend circumferentially, wherein said bottom vertex is a location of maximal axial extent of said tank interior space along said axis in a downward axial direction, and wherein said reservoir space extends farther in said downward axial direction beyond said bottom vertex.

7. The liquid storage tank arrangement according to claim 1, wherein said features of said liquid extraction arrangement are configured, dimensioned and arranged to separate the liquid from the driving gas due to a surface tension of the liquid and hydrostatic forces effective on the liquid.

8. The liquid storage tank arrangement according to claim 1, wherein said reservoir wall of said liquid reservoir comprises a double-walled vacuum-insulated reservoir wall that bounds said reservoir space.

9. The liquid storage tank arrangement according to claim 8, wherein said liquid reservoir further comprises plural layers of a foil forming a multi-layered radiative insulation arranged to further insulate said double-walled vacuum-insulated reservoir wall.

10. The liquid storage tank arrangement according to claim 1, wherein said liquid reservoir further comprises a foam insulation that insulates said reservoir wall.

11. The liquid storage tank arrangement according to claim 1, wherein at least a portion of said outlet pipe extending in said reservoir space is constructed as a heat pipe and has longitudinal grooves extending along an outer surface thereof.

12. The liquid storage tank arrangement according to claim 1, wherein said features of said liquid extraction arrangement adapted to separate the liquid from the driving gas in said reservoir space include a two-flanged metal plate having two plate flanges that extend from one another with a generally L-shape on said section plane and a curved metal plate spanning with a curved shape between said two plate flanges of said two-flanged metal plate so as to bound, between said curved metal plate and said two plate flanges, a channel with a generally quarter-circle-sector cross-sectional shape on said section plane.

13. The liquid storage tank arrangement according to claim 12, wherein said two-flanged metal plate and said curved metal plate are each perforated by plural holes.

14. The liquid storage tank arrangement according to claim 12, wherein said features of said liquid extraction arrangement adapted to separate the liquid from the driving gas further include a pleated sieve tube having a generally cylindrical shape with longitudinally extending pleats, wherein said pleated sieve tube is arranged in and extends along said channel and is connected to and communicates into said outlet pipe.

15. The liquid storage tank arrangement according to claim 14, wherein said features of said liquid extraction arrangement adapted to separate the liquid from the driving gas further include end plates having a triangular shape joined to and spanning an angle between said two plate flanges at respective opposite ends of said two-flanged metal plate, and wherein said pleated sieve tube is secured at a longitudinal center thereof on said two-flanged metal plate and at ends thereof on said end plates.

16. The liquid storage tank arrangement according to claim 14, further comprising mounting spacers interposed between and connecting said two-flanged metal plate to said reservoir wall, wherein said spacers are located adjacent to edges of said two-flanged metal plate respectively oriented away from said pleated sieve tube.

17. The liquid storage tank arrangement according to claim 12, wherein said features of said liquid extraction arrangement adapted to separate the liquid from the driving gas in said reservoir space further include plural metal stiffener rib plates that each have a triangular shape joined to and spanning an angle between said two plate flanges, whereby said stiffener rib plates make no contact with said tank wall.

18. The liquid storage tank arrangement according to claim 17, wherein said stiffener rib plates are spaced apart from one another and flare outwardly conically away from one another toward said tank wall.

19. The liquid storage tank arrangement according to claim 1, wherein said features of said liquid extraction arrangement adapted to separate the liquid from the driving gas include a pleated sieve tube having a generally cylindrical shape with longitudinally extending pleats, wherein said pleated sieve tube is connected at a center thereof to an end of said outlet pipe in a T-configuration.

20. A liquid storage tank arrangement for a spacecraft, adapted to store a liquid for operation of the spacecraft and a pressurized driving gas for driving the liquid out of said liquid storage tank arrangement, said liquid storage tank arrangement comprising:

a liquid storage tank enclosing a tank interior space adapted to store the liquid and the driving gas therein, wherein said tank is formed by two half-shells including a radially inner half-shell and a radially outer half-shell that are connected with one another at a connection area and that define and bound said tank interior space annularly between said two half-shells, wherein said radially outer half-shell has plural throughholes penetrating therethrough; and a liquid extraction arrangement comprising features adapted to separate the liquid from the driving gas based on a surface tension of the liquid, a refillable liquid reservoir that is arranged directly on an outer side of said radially outer half-shell at or adjacent to said connection area and that bounds therein a reservoir space which communicates with said tank interior space through said plural throughholes, and a liquid outlet pipe that communicates from said reservoir space out of said liquid reservoir.

* * * * *